April 1, 1969    J. D. CORRIGAN ET AL    3,436,521
METHOD OF MAKING COMPOSITE PANELS BY ELECTRIC-ARC BRAZE-WELDING
Filed Sept. 29, 1965    Sheet 1 of 2

INVENTORS
JAMES D. CORRIGAN
LESTER T. BOWERS
RICHARD C. GILMOUR
ROBERT A. WOLFF

BY John B. Sowell
ATTORNEY

INVENTORS
JAMES D. CORRIGAN
LESTER T. BOWERS
RICHARD C. GILMOUR
ROBERT A. WOLFF
BY John B. Sowell
ATTORNEY 3,436,521
METHOD OF MAKING COMPOSITE PANELS BY ELECTRIC-ARC BRAZE-WELDING James D. Corrigan, Plain Hill, N.J., and Lester T. Bowers, Oreland, Richard C. Gilmour, Yeadon, and Robert A. Wolff, North Hills, Pa., assignors to The Budd Company, Philadelphia, Pa., a corporation of Pennsylvania
Filed Sept. 29, 1965, Ser. No. 491,172
Int. Cl. B23k 1/04, 1/10
U.S. Cl. 219—129          4 Claims

ABSTRACT OF THE DISCLOSURE

A method for joining preformed sheet steel panels by electric-arc braze-welding at temperatures below the melting point of the steel. A nonferrous filler metal is deposited on the adjacent edges and in the gap between the panels and the excess on the exposed surface is removed by machine scarfing and hand finishing.

---

This invention relates to a method of making lead-free joints between preformed metal panels, and more particularly to a method of making a composite automobile roof structure from a plurality of finished panels.

The preferred present practice in the automotive industry is to make roof structures from a single piece of sheet metal if the structure permits. Hardtop roof structure usually requires that the structure be made of several panels welded together and a lead joint is employed to cover the weld. This is presently accomplished by offsetting the edges of the panels to be joined below the normal surface of the panel contour. The offset edges are lapped over each other or butted, then welded and covered with lead. Extensive high skill hand operations are required to finish lead joints. Even then, these joints have a tendency to crack open under stress.

Techniques such as flash welding two panels together and removing the upset flash welded material either before or after die forming, have not been found practical for making hardtop roof structures. Panels joined by mash welding, with or without foil, either before or after die forming, have not been found practical for making hardtop roof structures. Panels joined by electric arc or gas welds have not heretofore resulted in acceptable hardtop roof structures.

It is desirable from the standpoint of health and cost to eliminate leaded joints on autobody coachwork, and it is a necessity to purchaser acceptance that joints between finished body panels be invisible when covered with paint. Prior art composite panel structures have never met both of these requirements. The need has become more acute in recent years with the advent of sharp corners, relative flat, unornamented hardtop roof structures where the joint lines are at eye level.

Therefore, it is a primary object of the present invention to provide an improved method of making composite automobile roof structures with lead-free joints.

It is a further object of the present invention to provide a method of making an electrode deposited joint between preformed steel sheet metal panels without heat distorting or changing the surface contour of the sheet metal panels.

It is a general object of the present invention to provide a novel method of joining and finishing preformed sheet metal panels to produce a smooth class-one finish ready for paint without filling or leading.

According to the preferred embodiment of the present invention a plurality of steel sheet metal panels are die formed to their finished shape. The edges to be joined are precision trimmed and clamped by chill bars of a jig fixture to provide a closely fitted gap between panels arranged in their final contour position. The panels to be joined are braze-welded by electric arc at a temperature well below the melting point of the steel sheet. Nonferrous filler metal is deposited on the adjacent sheet metal surfaces and in the gap between panels. Backup mandrels are preferably provided as an integral part of the chill bars and jig to insure a controlled flow of the deposited rod between sheets and to provide a controlled raised excess deposit above the final contour of the joined panels. The raised excess deposit is removed by machine scarfing the excess deposited metal until it conforms to the surface contour of the panels, yet leaving a very thin strip above the surface contour. Removal of the thin strip by hand finishing leaves deposited metal in the gap between panels. The resulting class-one finish composite sheet metal structure is then ready for paint and the joint is stronger than the parent metal.

Further objects and advantages will be apparent from the drawings and the following description.

Figure 1:
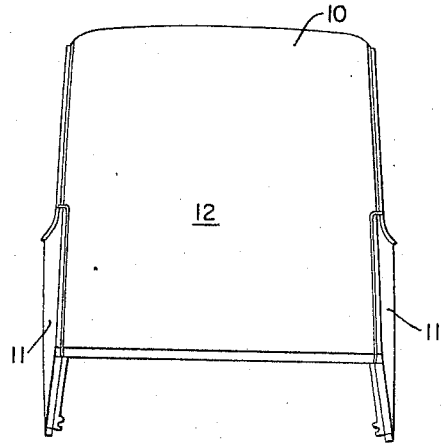
FIG. 1 is plan view of the finished composite roof structure.

In the preferred embodiment a roof panel 10 is joined to ear muffs 11 to form a composite roof structure 12. The weld line 13 precedes from the rear window area 14 along the top of the roof panel 10 to a point opposite the rear edge of the rear side window 15. As will be explained hereafter, panels 10 and 11 are spaced apart from each other and in the finished product are separated by a deposit of nonferrous metal deposited in the weld line 13.

Figure 2:
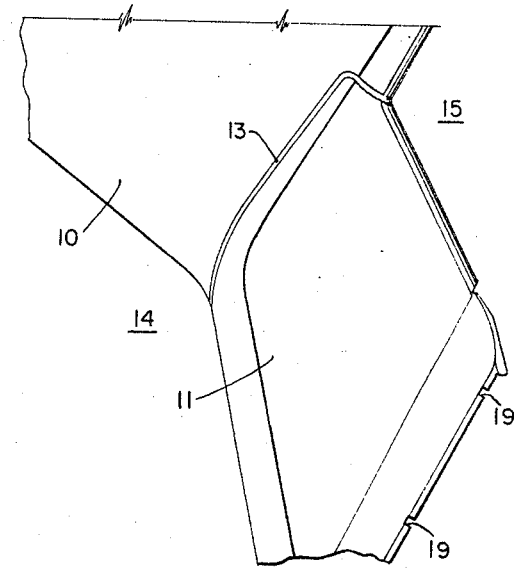
FIG. 2 is an enlarged perspective view of the finished joint between panels.
Figure 3:
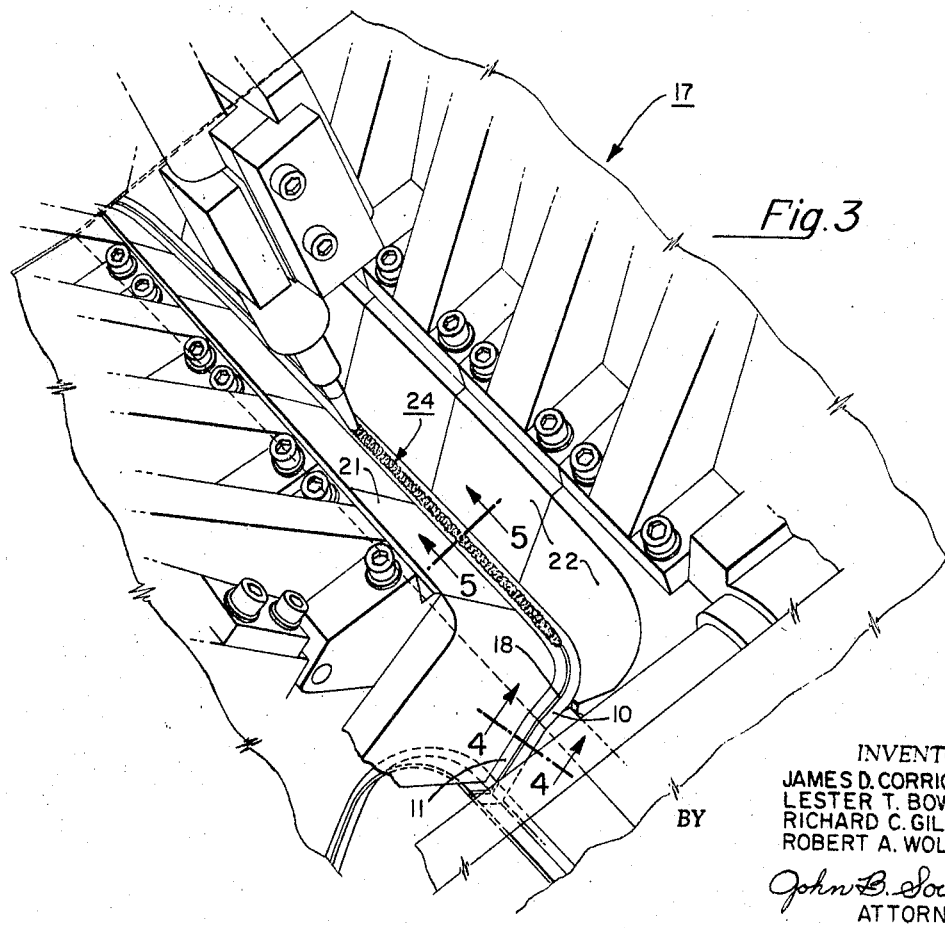
FIG. 3 is a perspective view of two panels clamped in a jig fixture showing the nonferrous electrode being braze-weld deposited to the gap between panels.

FIG. 3 shows roof panel 10 and an ear muff panel 11 positioned in a precision jig fixture 17 so that a gap 18 separates the two panels. It will be understood that it is necessary to cut the panels 10 and 11 very accurately so that the gap 18 is substantially uniform. This can be accomplished by any known means, such as by trimming dies. Panels 10 and 11 are usually provided with guide means 19, such as those shown in FIG. 2, to facilitate precision location during trimming and positioning operations.

Figure 4:
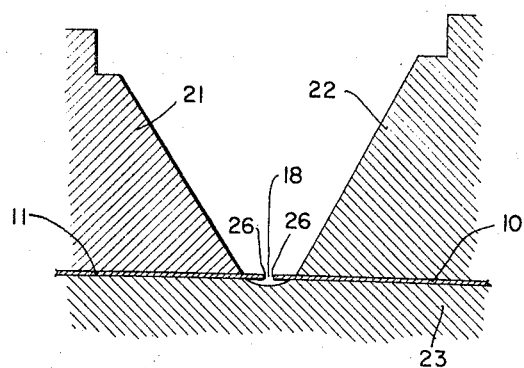
FIG. 4 is a section taken at lines 4—4 of FIG. 3, showing the gap before being welded.
Figure 5:
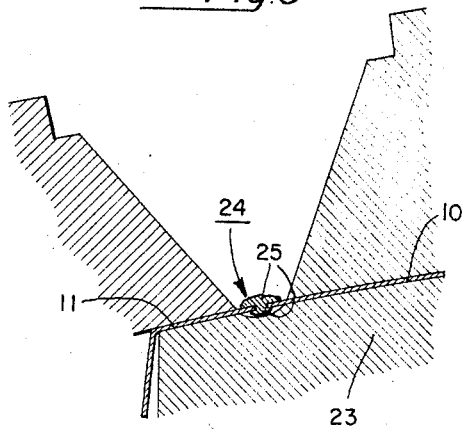
FIG. 5 is a section taken at lines 5—5 of FIG. 3, showing the welded joint.

FIGS. 3 to 5 show the panels 10 and 11 clamped by a plurality of upper chill bars 21 and 22 cooperating with lower mandrel or chill bar 23. A nonferrous wire electrode is deposited in the gap 18 by metal inert gas (MIG) electric arc apparatus. The preferred apparatus is referred to in the welding art as short arc welding apparatus. Deposited electrode 24, as shown in FIG. 5, flows into the gap 18 and is chilled by touching the mandrel 13, thus limiting the size of the formation on the raised excess deposit 25 or the underside of the roof structure. A raised excess deposit 25 of molten electrode is also applied above the surface contour of the panels 10 and 11.

When a silicon bronze wire electrode was employed in conjunction with an argon gas shield, a complete wetting action was obtained at the edges 26 of gap 18. Even though the electrode has been deposited by electric arc welding a brazing action was performed. The bronze electrode is melted at a temperature substantially below the plastic deformation point of the steel sheet, as a result, there is no fusion or distortion of the steel sheet. The braze-welding process employed in depositing the bronze electrode has sufficiently heated the edges 26 of the steel sheet above the melting point of the electrode material to cause a brazed bond between the electrode and the steel. Maintaining the temperature of the sheet metal below its plastic deformation point during the braze-weld operation has avoided deformation of the sheet material which normally accompanies welding with a filler rod.

The raised excess deposits 25 above and below the panels may be controlled in size. A gap of .030″ or more assures that some wetting of the edges takes place. The volume of electrode deposited controls the size of the upper excess deposit 25. The size of the lower excess deposit 25 is determined by gap 18 and by lower mandrel 23. This mandrel as well as chill bars 21, 22 may be provided with water cooling to insure uniform results under high rates of production.

Several control variables are employed simultaneously to maintain the correct temperature into the heat affected zone of the deposited electrode 24. The rate of electrode wire feed and the linear rate of travel of the welding gun affect the amount of the raised excess deposit 25, the current and voltage affect the temperature in the weld zone.

In the preferred embodiment, silicon bronze wire electrode of .035″ diameter was deposited at a rate of 22″ to 30″ per minute linear speed while maintaining 90 to 95 amp current at approximately 16 volts. The width of the upper weld deposit was approximately .125″ on either side of the gap when the gap between edges 26 was maintained at approximately .020″ to .045″. It was found that consistent results were best obtained by maintaining constant voltage and constant volume of wire per linear inch. Other variables were employed to maintain the heat affected zone at a temperature below the plastic deformation point of the sheet steel but substantially above the melting point of the nonferrous electrode.

Figure 6:
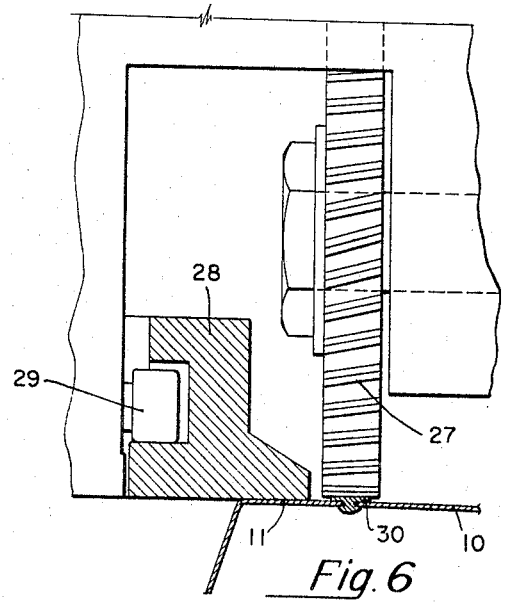
FIG. 6 is a section of the weld of FIG. 5, showing a first milling or scarfing operation.

Raised excess deposit 25 is removed by a rotating multi-edge milling cutter head 27, as shown in FIG. 6. The head 27 is guided by cam 28 and roller 29 so that cutter head 27 traverses a path parallel to the surface contour of the panels 10 and 11. In the preferred embodiment, the raised excess deposit is desired so that the cutter head will be continuously removing metal. When the deposit is not excessive, the cutter head has a tendency to ride up and off the deposited electrode or to cut into the surface contour of the steel sheet. Cutter head 27 can be guided to within .003″ of the surface contour, thus leaving only a thin film or strip 30 (shown exaggerated) above the surface contour of the panels. The raised excess deposit also enables a milling cutter to be employed to remove the deposited electrode without tearing or galling the metal in the gap 18. Lead joints cause galling and steel joints must be cut very slow to avoid heat distortion and are difficult to finish.

Figure 7:
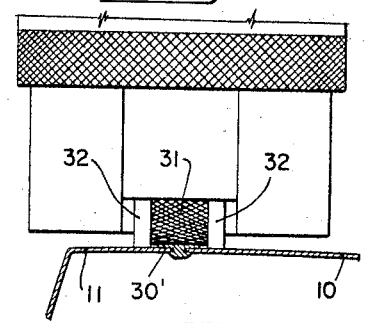
FIG. 7 is a section of the weld of FIG. 6, showing a second machining operation which may be employed.

FIG. 7 illustrates an alternative type of cutter head. The carbide knurled wheel 31 is provided with roller guide edges 32 so that a very fine and smooth cut can be made of the raised excess deposit 25. This type of cutter may be employed as a second mill cutter to virtually remove all of the excess deposit above the surface contours of the panels if so desired.

Figure 8:
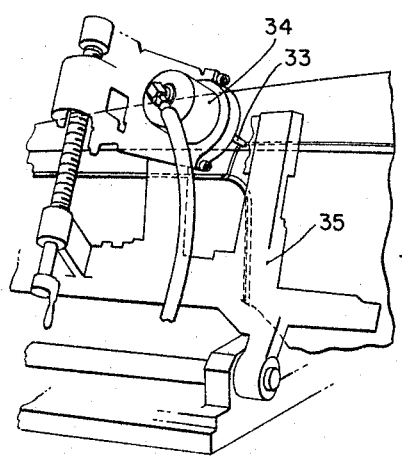
FIG. 8 is a perspective view showing yet another machining operation which may be employed.

FIG. 8 illustrates yet another type of milling head cutter. Cutter head 33 has cutting blades or edges on the end of the cylindrical cutting tool as distinguished from the outside perimeter of rotating tools 27 and 31, thus permitting a mill cut to be made abutting an obstruction, such as a gutter of roof panel 11. The drive motor 34 is preferably mounted on a pivotable frame 35 under the control of a cam follower, not shown, and automatic spacing and stop are provided to prevent cutter 33 from cutting into the gutter edge.

After performing one or more of the cutting or milling operations described above, a very thin film or strip 30′ is all that remains of the raised excess deposit 25. Since the deposited electrode 24 is a nonferrous metal it is considerably softer than the preformed sheet steel panels 10 and 11, thus enabling the continuous surface contour formed by the panels 10 and 11 to be used as a guide for buffing or sanding wheels when removing the thin film strip 30′.

Figure 9:
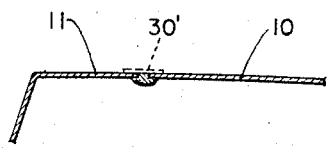
FIG. 9 is a section of the weld at lines 5—5 of FIG. 3 after being finished.

As shown in FIG. 9, preformed panels 10 and 11 are still precision positioned relative one to the other with a gap 18 therebetween. However, the edges 26 in the gap 18 and the surface of the panels 10 and 11 adjacent and below the gap 18 are integrally braze connected by a deposited electrode, and a raised convex weld formation reinforces the opposite side.

In actual practice the above method has been performed rapidly and efficiently with completely consistent results. The composite hardtop roof structure on which the method was performed requires no further filling or finishing operations before being painted. When the composite panels are painted with the new ultrathin acrylic paints it is impossible to detect where the weld line occurs. Even though the deposited metal is nonferrous and the panels are sheet steel a complete braze cohesion or bond has been accomplished by weld-brazing without any diffusion of the nonferrous metal into the sheet steel creating a joint stronger than the parent sheet steel. Thereafter, during rough handling in assembly operations and even under highly stressed road conditions there is no chance that the finished joint will crack open as has been the tendency with the prior art use of lead joints. It is apparent that some panel shapes can best be welded on one side and the excess deposit removed from the other side.

The terms employed herein are to be given the meaning adopted by the American Welding Society. While a preferred embodiment of the present invention has been explained, the invention is only limited by the appended claims.

What we claim is:

1. The method of making a composite roof structure from a plurality of preformed steel sheet metal panels comprising the steps of cutting each said preformed panel along an edge to be joined, clamping at least two of said panels in a jig fixture so that the edges to be joined form a gap between juxtaposed edges, cooling the edges of said steel sheet metal panels to be joined along the length of said edges by clamping the steel sheets adjacent the gap with thermal conductive chill bars above and below the gap and applying an inert gas to the electrode being deposited, electric-arc braze-welding said edges by simultaneously filling said gap between said edges to be joined with electrode metal and depositing excess electrode metal above and adjacent and below and adjacent said gap for providing a volume of metal on either side of said gap in adhesion with the top of said steel sheets to avoid concentrating the force of the rotating milling cutter head to the deposited electrode in said gap, cutting away the major portion of the deposited excess electrode above and adjacent said gap by slowly passing a rotating multiedge milling cutter head along said gap at a predetermined distance above said steel sheet metal panel to avoid heat buildup due to cutting action, and simultaneously removing all deposited electrode metal above said gap and preparing both the deposited electrode metal in the gap and the adjacent steel sheet for paint by rotational abrasive buffing.

2. The method of making a composite roof structure from a plurality of preformed steel sheet metal panels comprising the steps of clamping a plurality of steel sheet metal panels in a fixture so that the sheets are spaced apart one from the other to provide a gap therebetween, depositing a molten bronze electrode by electric arc welding in said gap and simultaneously controlling the flow of said electrode to provide a deposit of electrode metal in the gap and excess deposits above and below the surface contours of the sheet metal panels, said electrode being deposited at a temperature below the plastic deformation point of the sheet metal panels to provide a braze-weld coalescence between the bronze and the steel, machine scarfing a portion of said excess deposit of electrode from above the surface contours of the sheet metal panels and simultaneously forming a thin strip of deposited metal above said gap and said surface contours of said panels, and removing said thin strip of deposited metal from above said surface contours of said panels and simultaneously finishing the surface of said joint by abrasion.

3. The method of making a composite roof structure as claimed in claim 2, wherein at least two of said steel panels are spaced relative one to the other to form a continuous surface contour having the gap at the upper surface between the edges, providing an inert gas shroud for the molten bronze electrode, and using the steel panels as a surface guide during the finishing of said joint by abrasion.

4. The method of making a composite roof structure as claimed in claim 2 wherein a heat sink mandrel is clamped to said sheet metal panels adjacent said gap for controlling the temperature of the sheet metal panels in the heat affected zone at a temperature substantially above the melting point of the bronze electrode for insuring wetting and braze coalescence of the molten bronze electrode within and immediately adjacent said gap.

References Cited

UNITED STATES PATENTS

| | | |
|---|---|---|
| 1,502,789 | 7/1924 | Lincoln _____ 219—137 |
| 1,660,491 | 2/1928 | Leeper _____ 219—137 |
| 1,958,103 | 5/1934 | Kelley. |
| 2,206,375 | 7/1940 | Swift _____ 219—137 |
| 2,352,716 | 7/1944 | Jones _____ 29—491 X |
| 2,362,505 | 11/1944 | Smith. |
| 2,893,292 | 7/1959 | Naperola. |
| 2,963,570 | 12/1960 | Rieppel _____ 219—137 X |

RICHARD M. WOOD, *Primary Examiner.*

R. F. STAUBLY, *Assistant Examiner.*

U.S. Cl. X.R.

29—481, 487, 490, 491; 219—130, 137